(12) United States Patent
Desai et al.

(10) Patent No.: US 11,972,283 B2
(45) Date of Patent: *Apr. 30, 2024

(54) MANAGING CONFIGURATION AND SENSITIVE DATA FOR WORKLOADS IN A VIRTUALIZED COMPUTING SYSTEM

(71) Applicant: VMware, Inc., Palo Alto, CA (US)

(72) Inventors: Yash Nitin Desai, Mountain View, CA (US); Abhishek Srivastava, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/683,239

(22) Filed: Feb. 28, 2022

(65) Prior Publication Data

US 2023/0013405 A1 Jan. 19, 2023

Related U.S. Application Data

(63) Continuation of application No. 16/933,812, filed on Jul. 20, 2020, now Pat. No. 11,263,041.

(51) Int. Cl.
*G06F 9/455* (2018.01)
*G06F 9/445* (2018.01)
*G06F 9/54* (2006.01)

(52) U.S. Cl.
CPC ...... *G06F 9/45558* (2013.01); *G06F 9/44505* (2013.01); *G06F 9/45545* (2013.01);
(Continued)

(58) Field of Classification Search
CPC .. G06F 9/45558; G06F 9/45545; G06F 9/547; G06F 2009/4557; G06F 2009/45579
See application file for complete search history.

(56) References Cited

U.S. PATENT DOCUMENTS 8,521,966 B2 8/2013 Wibling et al.
2016/0335107 A1* 11/2016 Behera ................ H04L 41/0806
(Continued)

OTHER PUBLICATIONS

Kubernetes, Secrets, 2019, 32 pages, URL: https://v1-16.docs.kubernetes.io/docs/concepts/configuration/secret/.

*Primary Examiner* — Dong U Kim
(74) *Attorney, Agent, or Firm* — Kim & Stewart LLP

(57) ABSTRACT

An example virtualized computing system includes: a host cluster having a virtualization layer directly executing on hardware platforms of hosts, the virtualization layer supporting execution of virtual machines (VMs), the VMs including pod VMs and native VMs, the pod VMs including container engines supporting execution of containers in the pod VMs, the native VMs including applications executing on guest operating systems; an orchestration control plane integrated with the virtualization layer and including a master server and native VM controllers, the master server managing lifecycles of the pod VMs and the native VMs; and management agents, executing in the native VMs, configured to receive decoupled information from the master server through the native VM controllers and to provide the decoupled information for consumption by the applications executing in the native VMs, the decoupled information including at least one of configuration information and secret information.

20 Claims, 5 Drawing Sheets

(52) U.S. Cl.
CPC ...... *G06F 9/547* (2013.01); *G06F 2009/4557* (2013.01); *G06F 2009/45579* (2013.01)

(56) References Cited

U.S. PATENT DOCUMENTS

| | | | |
|---|---|---|---|
| 2017/0180249 A1* | 6/2017 | Shen | H04L 45/586 |
| 2019/0180006 A1* | 6/2019 | Bojjireddy | G06F 9/455 |
| 2019/0373052 A1* | 12/2019 | Pollitt | G06F 9/5072 |
| 2021/0117241 A1* | 4/2021 | Xia | G06F 9/5072 |
| 2021/0224093 A1* | 7/2021 | Fu | G06F 9/5072 |

* cited by examiner

MANAGING CONFIGURATION AND SENSITIVE DATA FOR WORKLOADS IN A VIRTUALIZED COMPUTING SYSTEM

CROSS-REFERENCE

This application is a continuation of U.S. patent application Ser. No. 16/933,812, filed Jul. 20, 2020, which is incorporated by reference herein.

BACKGROUND

Applications today are deployed onto a combination of virtual machines (VMs), containers, application services, and more. For deploying such applications, a container orchestrator (CO) known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into logical unit called "pods" that execute on nodes in a cluster (also referred to as "node cluster"). Containers in the same pod share the same resources and network and maintain a degree of isolation from containers in other pods. The pods are distributed across nodes of the cluster. In a typical deployment, a node includes an operating system (OS), such as Linux®, and a container engine executing on top of the OS that supports the containers of the pod. A node can be a physical server or a VM.

Modern workload management software such as Kubernetes allow you to decouple configuration and sensitive information from pods and make the applications mode secure and portable. This separation also allows for managing and updating the configuration and sensitive information without updating application code, allowing for live updates of this information. The configuration information can include, for example, configuration files, environment variables, and the like. Sensitive information can include, for example, passwords, secure shell (SSH) keys, tokens, and the like. Workload management software allows for passing this information to the pods in various ways, including setting environment variables, creating files containing this information, and the like. It is desirable to extend these features of the workload management software for use with applications executing outside of a pod context, such as within a VM.

SUMMARY

In an embodiment, a virtualized computing system includes: a host cluster having a virtualization layer directly executing on hardware platforms of hosts, the virtualization layer supporting execution of virtual machines (VMs), the VMs including pod VMs and native VMs, the pod VMs including container engines supporting execution of containers in the pod VMs, the native VMs including applications executing on guest operating systems; an orchestration control plane integrated with the virtualization layer, the orchestration control plane including a master server and native VM controllers, the master server managing lifecycles of the pod VMs and the native VMs, the native VM controllers executing in the virtualization layer external to the VMs and configured as agents of the master server to manage the VMs; and management agents, executing in the native VMs, configured to receive decoupled information from the master server through the native VM controllers and to provide the decoupled information for consumption by the applications executing in the native VMs, the decoupled information including at least one of configuration information and secret information.

In another embodiment, a host computer in a host cluster of a virtualized computing system includes: a hardware platform; a virtualization layer, directly executing on the hardware platform, supporting execution of virtual machines (VMs), the VMs including pod VMs and native VMs, the pod VMs including container engines supporting execution of containers in the pod VMs, the native VMs including applications executing on guest operating systems; a native VM controller, executing in the virtualization layer external to the VMs, configured as an agent of an orchestration control plane of the virtualized computing system, the native VM controller configured to manage the native VMs; and management agents, executing in the native VMs, configured to receive decoupled information from the native VM controllers and to provide the decoupled information for consumption by the applications executing in the native VMs, the decoupled information including at least one of configuration information and secret information managed by the orchestration control plane.

In another embodiment, a method of application orchestration in a virtualized computing system is described. The virtualized computing system includes a host cluster having a virtualization layer directly executing on hardware platforms of hosts, the virtualization layer supporting execution of virtual machines (VMs), the virtualization layer integrated with an orchestration control plane. The method includes: receiving, at a master server of the orchestration control plane, specification data for an application; deploying, based on the specification data, the application to a native VM the VMs, the native VM executing on the virtualization layer, the native VM executing a management agent configured as an agent of a VM controller in the virtualization layer; receiving decoupled information at the management agent from a master server of the orchestration control plane through the native VM controller; and providing the decoupled information for consumption by the applications executing in the native VMs, the decoupled information including at least one of configuration information and secret information.

DETAILED DESCRIPTION

Techniques for managing configuration and secret information for applications in a virtualized computing system are described. In embodiments described herein, the virtualized computing system includes a cluster of physical servers ("hosts") referred to as a "host cluster." The host cluster includes a virtualization layer, executing on hardware platforms of the hosts, which supports execution of virtual machines (VMs). A virtualization management server manages the host cluster, the virtualization layer, and the VMs executing thereon. The virtualized computing system includes shared storage accessible by the host cluster. The container orchestrator executes in the virtualized computing system (e.g., on one or more VMs) and is configured to deploy and manage applications in the host cluster. In embodiments, the container orchestrator is a Kubernetes system that deploys and manages containerized applications in a cluster of VMs (a "Kubernetes cluster").

In one or more embodiments, the orchestration control plane comprises a supervisor container orchestrator having extensions that cooperate with the virtualization management server and agents installed in the virtualization layer. A host cluster having the orchestration control plane is referred to herein as a "supervisor cluster." A user interacts with the orchestration control plane to deploy and manage applications executing on the supervisor cluster. In embodiments, the orchestration control plane uses hosts to implement nodes, and VMs to implement pods, of a Kubernetes cluster. Kubernetes pods are implemented as "pod VMs," each of which includes a kernel and container engine that supports execution of containers. The container orchestrator (e.g., Kubernetes) executes in VMs alongside the pod VMs. The container orchestrator is further configured to implement applications in native VMs alongside pods (e.g., non-containerized applications). Techniques are described to provide and update configuration/secret information used by applications executing in native VMs. These and further advantages and aspects of the disclosed techniques are described below with respect to the drawings.

Figure 1:
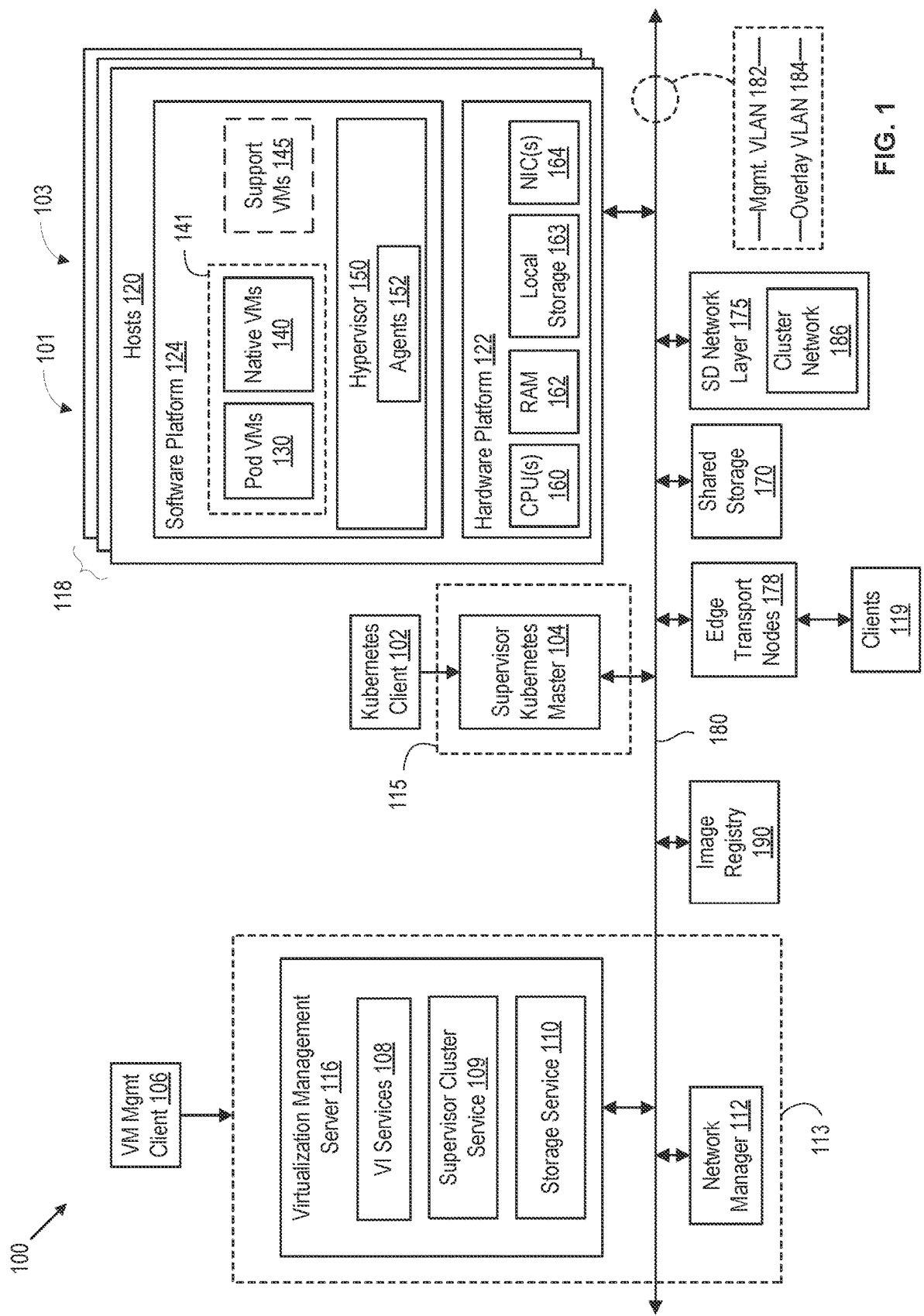
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA.

In the example of FIG. 1, host cluster 118 is enabled as a "supervisor cluster," described further herein, and thus VMS executing on each host 120 include pod VMs 130 and native VMs 140. A pod VM 130 is a virtual machine that includes a kernel and container engine that supports execution of containers, as well as an agent (referred to as a pod VM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized) (e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host duster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing.

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor duster environment. Other embodiments described below include a vanilla container orchestrator environment and a guest cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA.

Network manager 112 can deploy one or more transport zones in virtualized computing system 100, including VLAN transport zone(s) and an overlay transport zone. A WAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories for use in supplying images for containerized applications.

Virtualization management server 116 and network manager 112 comprise a virtual infrastructure (VI) control plane 113 of virtualized computing system 100. Virtualization management server 116 can include a supervisor cluster service 109, storage service 110, and VI services 108. Supervisor cluster service 109 enables host cluster 118 as supervisor cluster 101 and deploys the components of orchestration control plane 115. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

While FIG. 1 shows an example of a supervisor cluster 101, the techniques described herein do not require a supervisor cluster 101. In some embodiments, host cluster 118 is not enabled as a supervisor cluster 101. In such case, supervisor Kubernetes master 104, Kubernetes client 102, pod VMs 130, supervisor cluster service 109, and image registry 190 can be omitted. While host cluster 118 is show as being enabled as a transport node duster 103, in other embodiments network manager 112 can be omitted. In such case, virtualization management server 116 functions to configure SD network layer 175.

Figure 2:
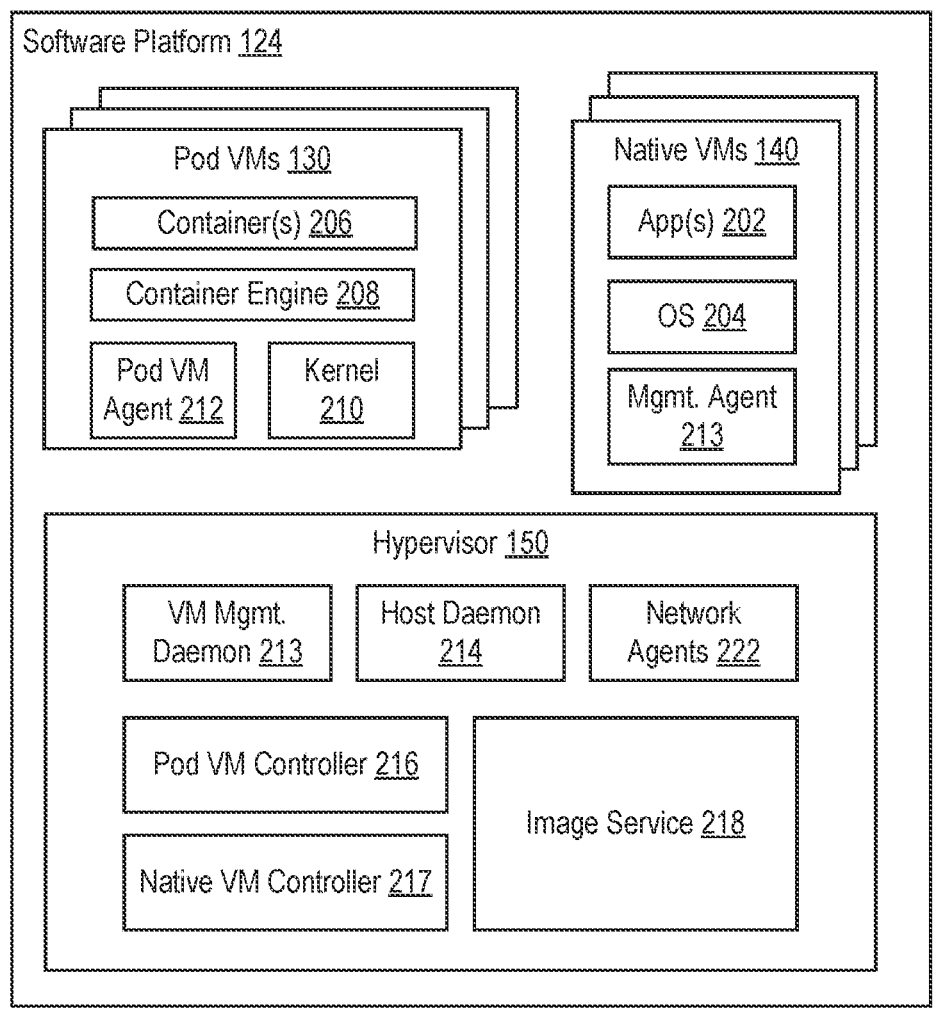
FIG. 2 is a block diagram depicting a software platform according an embodiment.

FIG. 2 is a block diagram depicting software platform 124 according an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod VM controller 216, a native VM controller 217, an image service 218, and network agents 222. VM management daemon 213 is an agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod VM controller 216 is an agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101. Native VM controller is an agent 152 of orchestration control plane 115 for supervisor cluster 101 and allows supervisor Kubernetes master 104 to interact with hypervisor 150 to manage lifecycles of native VMs 140 and applications executing therein. While shown separately from pod VM controller 216, in some embodiments both pod VM controller 216 and native VM controller 217 can be functions of a single controller.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Rather, native VMs 140 include management agents 213 that communicate with native VM controller 217. Container engine 208 can be an industry-standard container engine, such as libcontainer, runc, or containerd. Pod VMs 130, pod VM controller 216, native VM controller 217, and image service 218 are omitted if host cluster 118 is not enabled as a supervisor cluster 101.

Figure 3:
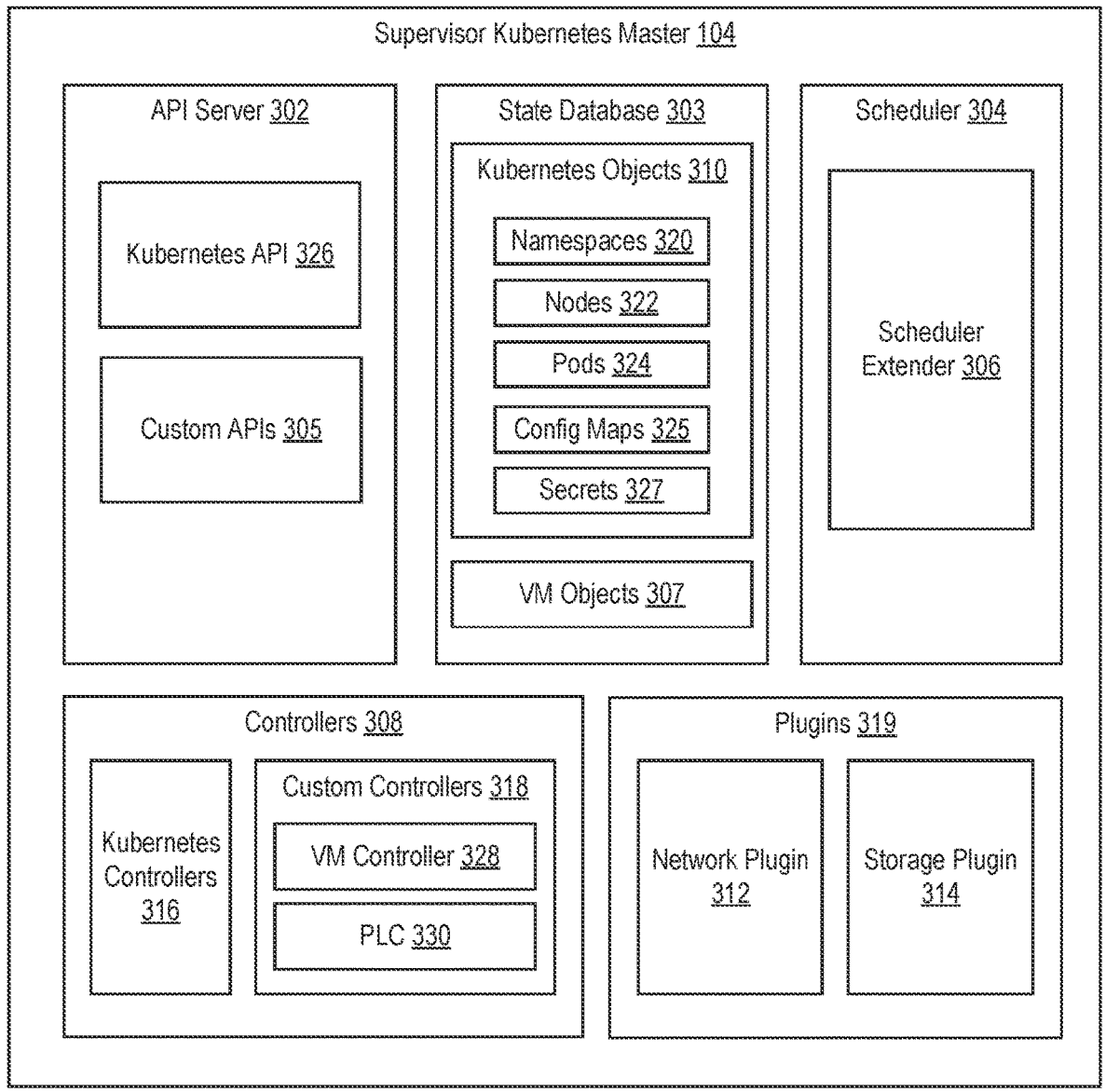
FIG. 3 is a block diagram of a supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, a scheduler extender 306, controllers 308, and plugins 319. API server 302 includes the Kubernetes API server, kube-api-server ("Kubernetes API 326") and custom APIs 305. Custom APIs 305 are API extensions of Kubernetes API 326 using either the custom resource/operator extension pattern or the API extension server pattern. Custom APIs 305 are used to create and manage custom resources, such as VM objects. API server 302 provides a declarative schema for creating, updating, deleting, and viewing objects.

State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state. Standard Kubernetes objects ("Kubernetes objects 310") include namespaces 320, nodes 322, pods 324, config maps 215, secrets 327, among others. Custom objects are resources defined through custom APIs 305 (e.g., VM objects 307). Namespaces 320 provide scope for objects. Namespaces are objects themselves maintained in state database 303. A namespace can include resource quotas, limit ranges, role bindings, and the like that are applied to objects declared within its scope. VI control plane 113 creates and manages supervisor namespaces for supervisor cluster 101. A supervisor namespace is a resource-constrained and authorization-constrained unit of multi-tenancy managed by virtualization management server 116. Namespaces 320 inherit constraints from corresponding supervisor cluster namespaces. Config maps 325 include configuration information for applications managed by supervisor Kubernetes master 104. Secrets 327 include sensitive information for use by applications managed by supervisor Kubernetes master 104 (e.g., passwords, keys, tokens, etc.). The configuration information and the secret information stored by config maps 325 and secrets 327 is generally referred to herein as decoupled information. Decoupled information is information needed by the managed applications, but which is decoupled from the application code.

Controllers 308 can include, for example, standard Kubernetes controllers ("Kubernetes controllers 316") (e.g., kube-controller-manager controllers, cloud-controller-manager controllers, etc.) and custom controllers 318. Custom controllers 318 include controllers for managing lifecycle of Kubernetes objects 310 and custom objects. For example, custom controllers 318 can include a VM controller 328 configured to manage VM objects 307 and a pod VM lifecycle controller (PLC) 330 configured to manage pods 324. A controller 308 tracks objects in state database 303 of at least one resource type. Controller(s) 308 are responsible for making the current state of supervisor cluster 101 come closer to the desired state as stored in state database 303. A controller 308 can carry out action(s) by itself, send messages to API server 302 to have side effects, and/or interact with external systems.

Plugins 319 can include, for example, network plugin 312 and storage plugin 314. Plugins 319 provide a well-defined interface to replace a set of functionality of the Kubernetes control plane. Network plugin 312 is responsible for configuration of SD network layer 175 to deploy and configure the cluster network. Network plugin 312 cooperates with virtualization management server 116 and/or network manager 112 to deploy logical network services of the cluster network. Network plugin 312 also monitors state database for custom objects 307, such as NIF objects. Storage plugin 314 is responsible for providing a standardized interface for persistent storage lifecycle and management to satisfy the needs of resources requiring persistent storage. Storage plugin 314 cooperates with virtualization management server 116 and/or persistent storage manager 110 to implement the appropriate persistent storage volumes in shared storage 170.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods. Scheduler 304 cooperates with scheduler extender 306, which interfaces with virtualization management server 116. Scheduler extender 306 cooperates with virtualization management server 116 (e.g., such as with DRS) to select nodes from candidate sets of nodes and provide identities of hosts 120 corresponding to the selected nodes. For each pod, scheduler 304 also converts the pod specification to a pod VM specification, and scheduler extender 306 asks virtualization management server 116 to reserve a pod VM on the selected host 120. Scheduler 304 updates pods in state database 303 with host identifiers.

Kubernetes API 326, state database 303, scheduler 304, and Kubernetes controllers 316 comprise standard components of a Kubernetes system executing on supervisor cluster 101. Custom controllers 318, plugins 319, and scheduler extender 306 comprise custom components of orchestration control plane 115 that integrate the Kubernetes system with host cluster 118 and VI control plane 113.

Figure 4:
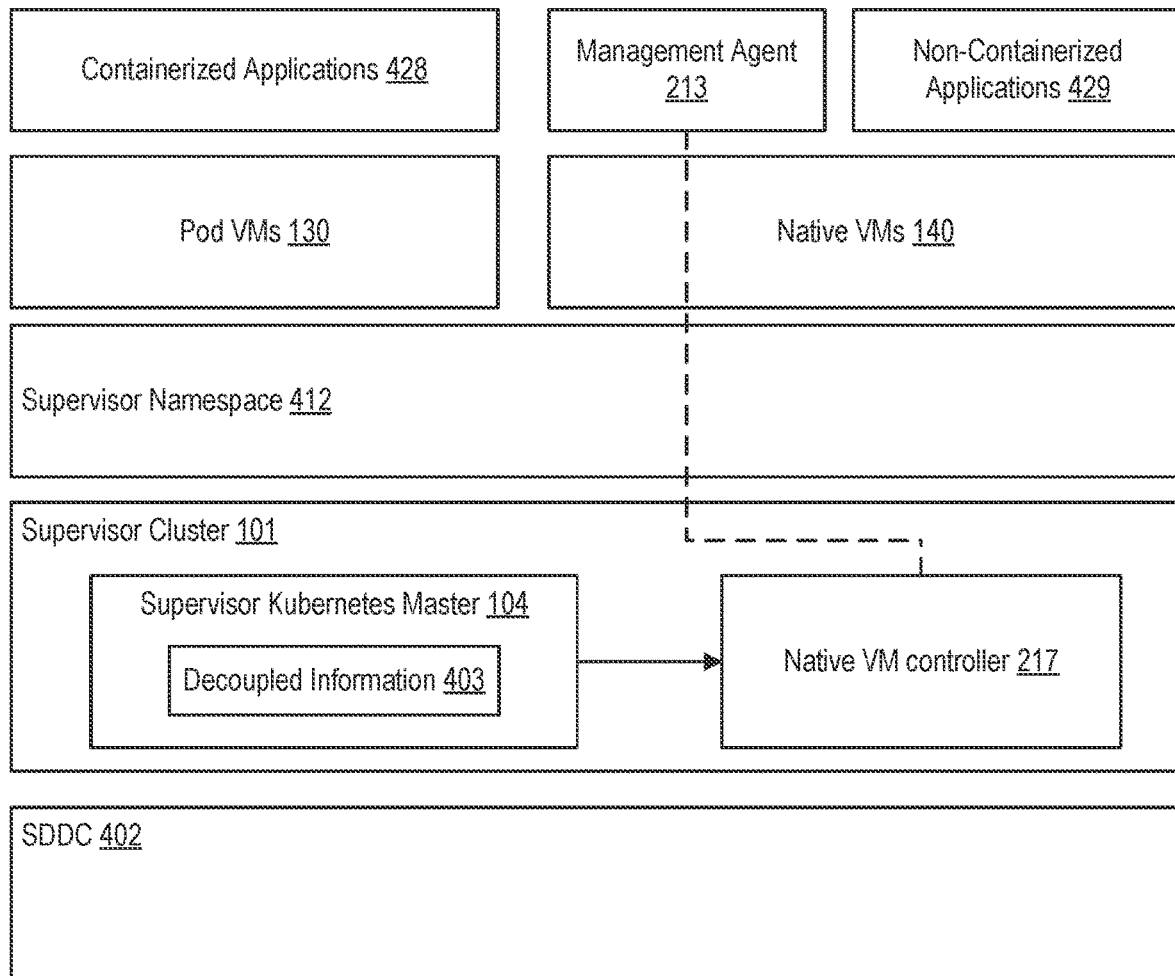
FIG. 4 is a block diagram depicting a logical view of a guest cluster executing in a virtualized computing system according to an embodiment.

FIG. 4 is a block diagram depicting a logical view of a guest cluster executing in a virtualized computing system according to an embodiment. Supervisor cluster 101 is implemented by a software-defined data center (SDDC) 402. SDDC 402 includes virtualized computing system 100 shown in FIG. 1, including host cluster 118, virtualization management server 116, network manager 112, shared storage 170, and SD network layer 175. SDDC 402 includes VI control plane 113 for managing a virtualization layer of host cluster 118, along with shared storage 170 and SD network layer 175. A VI admin interacts with VM management server 116 (and optionally network manager 112) of VI control plane 113 to configure SDDC 402 to implement supervisor cluster 101.

Supervisor duster 101 includes orchestration control plane 115, which includes supervisor Kubernetes master(s) 104. The VI admin interacts with VM management server 116 to create supervisor namespaces including supervisor namespace 412. Each supervisor namespace includes a resource pool and authorization constraints. The resource pool includes various resource constraints on the supervisor namespace (e.g., reservation, limits, and share (RLS) constraints). Authorization constraints provide for which roles are permitted to perform which operations in the supervisor namespace (e.g., allowing VI admin to create, manage access, allocate resources, view, and create objects; allowing DevOps to view and create objects; etc.). A user interacts with supervisor Kubernetes master 104 to deploy applications on supervisor cluster 101 within scopes of supervisor namespaces. In the example, the user deploys containerized applications 428 on pod VMs 130 and non-containerized applications 429 on native VMs 140. Non-containerized applications 429 execute on a guest operating system in a native VM 140 exclusive of any container engine.

As described above, Kubernetes allows passing of configuration and secret information to containerized applications 428. However, standard Kubernetes does not extend this functionality beyond pod-based workloads (i.e., containerized applications executing in pods). Embodiments described herein extend this functionality for applications executing in native VMs (e.g., non-containerized applications 429). In embodiments, supervisor Kubernetes master 104 manages lifecycle of decoupled information 403 (e.g., config maps and secrets) for non-containerized applications 429. That is, supervisor Kubernetes master 104 performs create, read, update, and delete operations on objects that include decoupled information 403. Supervisor Kubernetes master 104 provides decoupled information 403 to native VM controller 217 upon deployment of non-containerized applications 429 to native VMs 140. Native VM controller 217 cooperates with management agent 213 executing in each native VM 140 to provide decoupled information 403 for use by non-containerized applications 429. Management agent 213 in each native VM 140 exposes decoupled information 403 for access by non-containerized applications 429. In embodiments, management agent 213 creates environment variables accessible by non-containerized applications 429. In embodiments, management agent 213 creates files in a filesystem accessible by native VMs 140, which in turn can be read by non-containerized applications 429. In some embodiments, the files can be resident in system memory (e.g., RAM). Supervisor Kubernetes master 104 can provide updates to decoupled information 403 to native VM controller 217, which in turn provides the updates to management agent 213 for use by non-containerized applications 429.

When specifying a non-containerized application at supervisor Kubernetes master 104, the user can specify which decoupled information 403 upon which the application relies and how to consume the decoupled information (e.g., as environment variables, as files, etc.). Supervisor Kubernetes master 104 schedules the non-containerized application to run in a VM object implemented by a native VM 140. Upon deployment of native VM 140, management agent 213 establishes a connect with native VM controller 217 using a hypervisor-guest channel (e.g., a virtual socket connection). In embodiments, management agent 213 communicates with native VM controller 217 over the hypervisor-guest channel using a remote procedure call (RPC) protocol. Management agent 213 sets up decoupled information 403 as specified for each non-containerized application 429 (e.g., environment variables, files, etc.). Management agent 213 updates decoupled information 403 exposed to non-containerized applications 429 as updates are received from supervisor Kubernetes master 104 through native VM controller 217.

Figure 5:
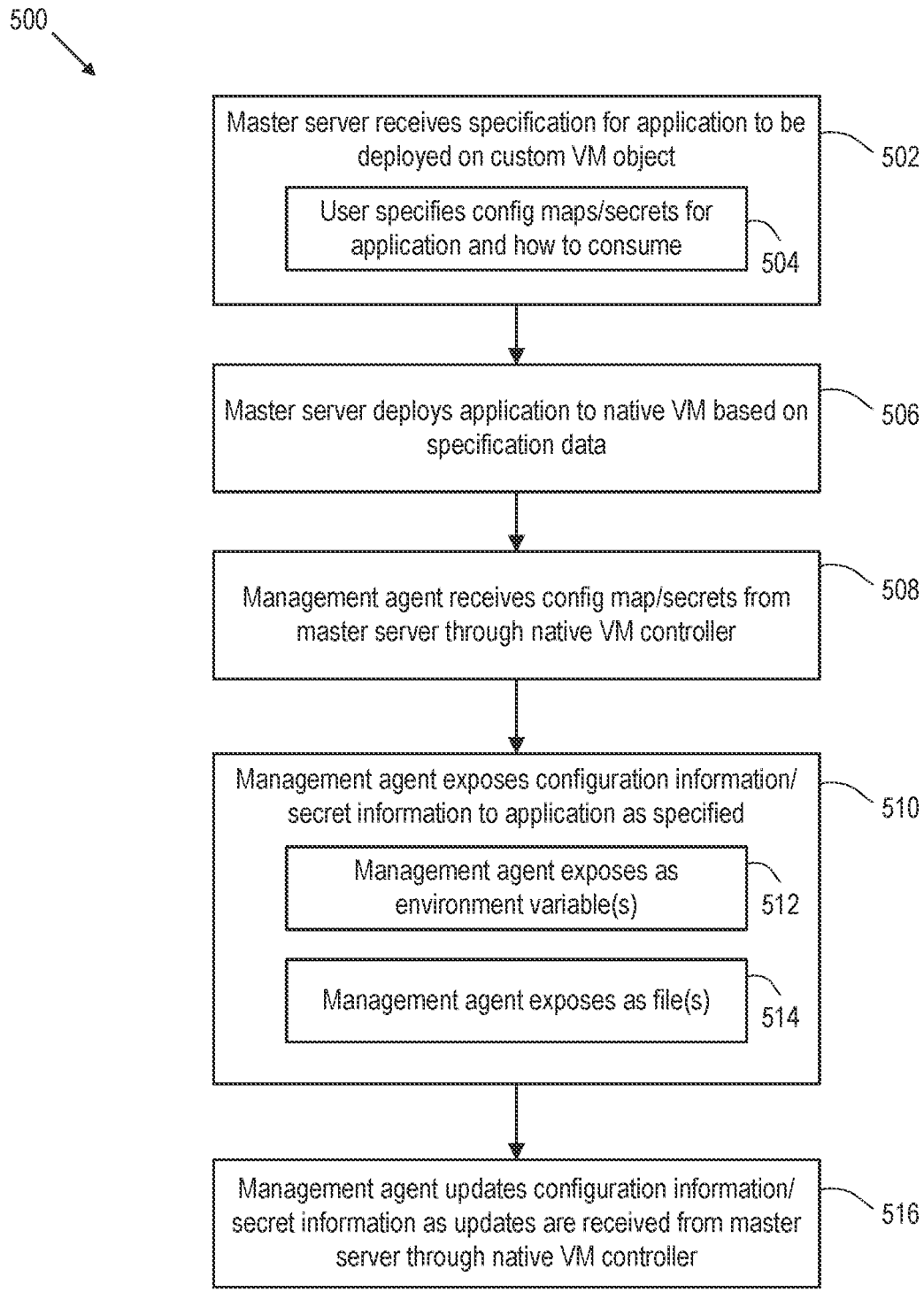
FIG. 5 is a flow diagram depicting a method of application orchestration in a virtualized computing system according to an embodiment.

FIG. 5 is a flow diagram depicting a method 500 of application orchestration in a virtualized computing system according to an embodiment. Method 500 can be performed by software in supervisor cluster 101 executing on CPU, memory, storage, and network resources managed by virtualization layer(s) (e.g., hypervisor(s)) or a host operating system(s). Method 500 can be understood with reference to FIG. 4.

Method 500 begins at step 502, where supervisor Kubernetes master 104 receives a specification for an application to be deployed using a custom VM object. At step 504, a user specifies configuration information and/or secret information for use by the application and specifies how such information is to be consumed by the application. Supervisor Kubernetes master 104 creates a VM object for the application and config map/secret objects for the configuration/secret information. At step 506, supervisor Kubernetes master 104 deploys the application to a native VM 140 based on the specification data. In embodiments, the application is a non-containerized application that executes on a guest operating system in native VM 140.

At step 508, management agent 213 receives config map/secrets from supervisor Kubernetes master 104 through native VM controller 217. At step 510, management agent 213 exposes the configuration/secret information in the config maps/secrets to the application as specified by the user. For example, at step 512, management agent 213 exposes the information as environment variables. In another example, at step 514, management agent 213 exposes the information as files (e.g., in a filesystem on storage or in memory). In still other examples, management agent 213 performs a combination of steps 512 and 514. At step 516, management agent 213 updates the configuration/secret information as updates are received from supervisor Kubernetes master 104 through native VM controller 217.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A virtualized computing system, comprising:
a host cluster having a virtualization layer directly executing on hardware platforms of hosts, the virtualization layer supporting execution of virtual machines (VMs), the VMs including native VMs, the native VMs including applications executing on guest operating systems;
an orchestration control plane integrated with the virtualization layer, the orchestration control plane including a master server and native VM controllers, the master server managing lifecycles of the native VMs, the native VM controllers executing in the virtualization layer external to the VMs and configured as agents of the master server to manage the native VMs; and
management agents, executing in the native VMs, configured to receive decoupled information from the master server through the native VM controllers and to provide the decoupled information for consumption by the applications executing in the native VMs, the decoupled information including at least one of configuration information and secret information.

2. The virtualized computing system of claim 1, wherein the applications in the native VMs are non-containerized.

3. The virtualized computing system of claim 1, wherein the management agents are connected to the native VM controllers through hypervisor-guest channels between the native VMs and the virtualization layer.

4. The virtualized computing system of claim 3, wherein the management agents communicate with the native VM controllers over the hypervisor-guest channels using a remote procedure call (RPC) protocol.

5. The virtualized computing system of claim 1, wherein the management agents expose at least a portion of the decoupled information to the applications via environment variables.

6. The virtualized computing system of claim 1, wherein the management agents expose at least a portion of the decoupled information to the applications via files stored in a filesystem accessible by the native VMs.

7. The virtualized computing system of claim 1, wherein the management agents are configured to receive updates to the decoupled information from the master server through the native VM controllers.

8. A host computer in a host cluster of a virtualized computing system, the host comprising:
a hardware platform;
a virtualization layer, directly executing on the hardware platform, supporting execution of virtual machines (VMs), the VMs including native VMs, the native VMs including applications executing on guest operating systems; and
a native VM controller, executing in the virtualization layer external to the VMs, configured as an agent of an orchestration control plane of the virtualized computing system, the native VM controller configured to manage the native VMs, wherein the native VMs include management agents executing therein to receive decoupled information from the native VM controllers and to provide the decoupled information for consumption by the applications executing in the native VMs, the decoupled information including at least one of configuration information and secret information managed by the orchestration control plane.

9. The host computer of claim 8, wherein the applications in the native VMs are non-containerized.

10. The host computer of claim 8, wherein the management agents are connected to the native VM controller through a hypervisor-guest channel between the native VMs and the virtualization layer.

11. The host computer of claim 10, wherein the management agents communicate with the native VM controller over the hypervisor-guest channel using a remote procedure call (RPC) protocol.

12. The host computer of claim 8, wherein the management agents expose at least a portion of the decoupled information to the applications via environment variables.

13. The host computer of claim 8, wherein the management agents expose at least a portion of the decoupled information to the applications via files stored in a filesystem accessible by the native VMs.

14. The host computer of claim 8, wherein the management agents are configured to receive updates to the decoupled information from the orchestration control plane through the native VM controllers.

15. A method of application orchestration in a virtualized computing system including a host cluster having a virtualization layer directly executing on hardware platforms of hosts, the virtualization layer supporting execution of virtual machines (VMs), the VMs including native VM executing on the virtualization layer, the native VM including an application executing on a guest operating system, the virtualization layer integrated with an orchestration control plane, the method comprising:
receiving decoupled information at a management agent from a master server of the orchestration control plane through a native VM controller, the management agent executing in the native VM and as an agent of the native VM controller, the native VM controller executing in the virtualization layer; and
providing the decoupled information for consumption by the application executing in the native VM, the decoupled information including at least one of configuration information and secret information.

16. The method of claim 15, wherein the application in the native VM is non-containerized.

17. The method of claim 15, wherein the management agent is connected to the native VM controller through a hypervisor-guest channel between the native VM and the virtualization layer.

18. The method of claim 15, wherein the management agent exposes at least a portion of the decoupled information to the application via environment variables.

19. The method of claim 15, wherein the management agent exposes at least a portion of the decoupled information to the application via files stored in a filesystem accessible by the native VM.

20. The method of claim 15, further comprising:
receiving updates to the decoupled information at the management agent from the master server through the native VM controller.

* * * * *